US008670195B2

(12) United States Patent
Ikushima et al.

(10) Patent No.: US 8,670,195 B2
(45) Date of Patent: Mar. 11, 2014

(54) LENS ACTUATOR

(75) Inventors: Kimiya Ikushima, Osaka (JP);
Hidekazu Tanaka, Osaka (JP);
Hiroyuki Togawa, Osaka (JP);
Norifumi Sata, Hyogo (JP); Takuo Osaki, Osaka (JP); Takatoshi Ono, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/486,187

(22) Filed: Jun. 1, 2012

(65) Prior Publication Data

US 2012/0314307 A1 Dec. 13, 2012

(30) Foreign Application Priority Data

Jun. 9, 2011 (JP) .................................. 2011-128786
Jun. 9, 2011 (JP) .................................. 2011-128788

(51) Int. Cl.
*G02B 7/02* (2006.01)
*G11B 3/00* (2006.01)

(52) U.S. Cl.
USPC ........... 359/814; 359/819; 359/823; 359/824; 369/149

(58) Field of Classification Search
USPC .......................... 359/811, 819–824, 813–815; 369/13.23, 44.22, 44.11, 44.14, 44.21, 369/149; 310/13; 720/683; 348/E5.028
See application file for complete search history.

(56) References Cited

U.S. PATENT DOCUMENTS

2005/0219025 A1* 10/2005 Kano et al. ..................... 335/285
2011/0097062 A1* 4/2011 Tsuruta et al. .................. 396/55

FOREIGN PATENT DOCUMENTS

WO 2009/133691 11/2009

* cited by examiner

*Primary Examiner* — Thomas K Pham
*Assistant Examiner* — Brandi Thomas
(74) *Attorney, Agent, or Firm* — Panasonic Patent Center

(57) ABSTRACT

A lens actuator includes a carrier that is configured to retain a lens; a first AF coil that is disposed in the carrier while wound about an axis perpendicular to a lens retaining surface; first to fourth magnets that are disposed opposite the first AF coil in four directions parallel to the lens retaining surface; a first OIS coil that is disposed opposite the first magnet; and a second OIS coil that is disposed opposite the second magnet. A current is passed through the first AF coil to move the carrier in a vertical direction along an axis. The currents are passed through the first and second OIS coils to a movable unit in front-back and left-right directions. Therefore, weight reduction of the movable unit can be achieved to provide a lens actuator, in which electric power saving can be achieved.

6 Claims, 14 Drawing Sheets

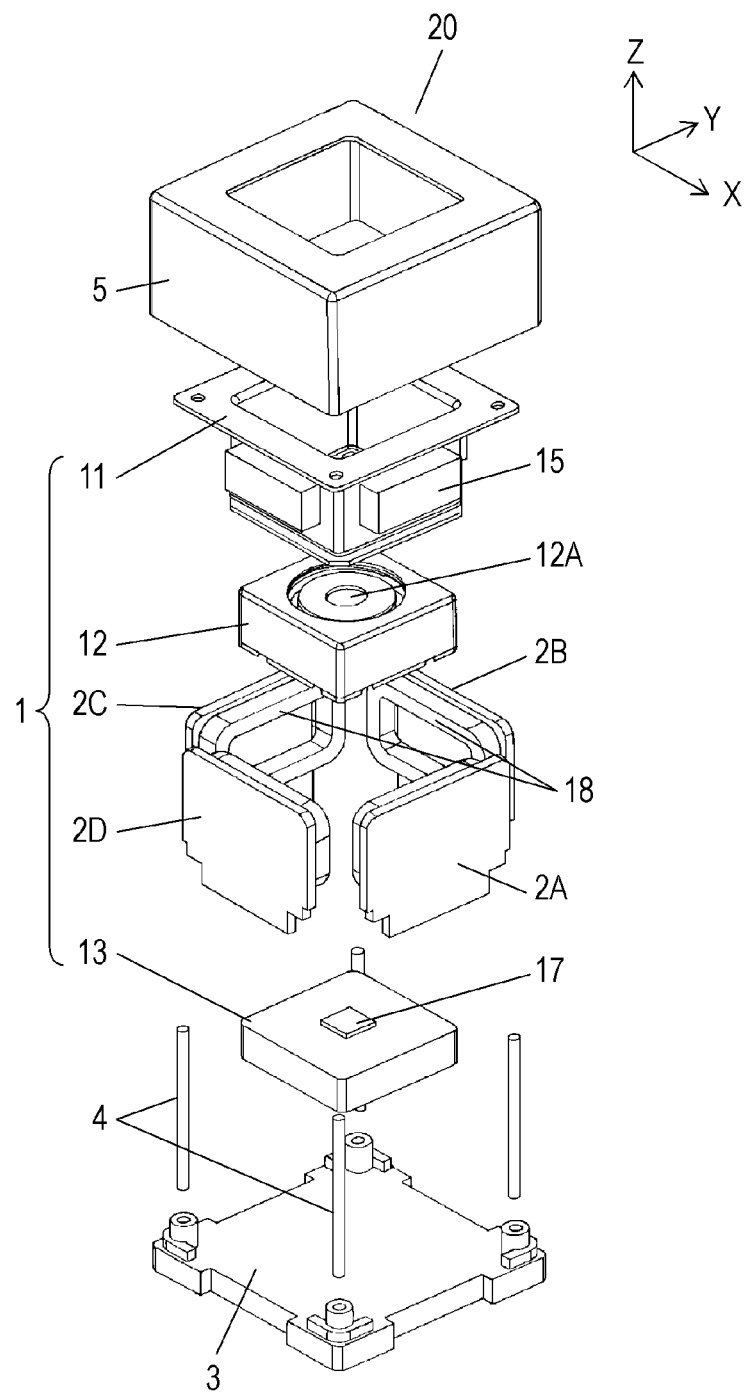

LENS ACTUATOR

BACKGROUND OF THE INVENTION

1. Field of the Invention

The technical field described herein generally relates to a lens actuator, which is used in a camera and a mobile phone.

2. Description of the Related Art

Recently, in a camera and a mobile phone, there has been proposed use of a lens actuator including a shake correction mechanism. The shake correction mechanism mechanically suppresses a vibration of a lens in order to prevent a disturbance of a video image or an image due to a camera shake during shooting.

A conventional lens actuator will be described with reference to FIGS. 13 and 14.

FIG. 13 is a perspective sectional view of conventional lens actuator 20. FIG. 14 is an exploded perspective view of lens actuator 20.

Lens actuator 20 includes movable unit 1, four coil retaining bodies 2A to 2D, lower cover 3, four wires 4, and upper cover 5. In lens actuator 20, movable unit 1 is swung when the camera shake is generated to suppress the disturbance of the video image or the image.

Movable unit 1 includes magnet holder 11, auto focus unit 12 in which the lens moves vertically therein, and imaging body 13.

Eight magnets 14 are fixed to an inside of auto focus unit 12 while arrayed in two upper and lower stages. Four magnets 15, each being slightly larger than magnet 14, are fixed to lateral surfaces on front-back and left-right sides of magnet holder 11.

Auto focus unit 12 includes a round hole 12A in which the lens is fixed, and auto focus unit 12 is accommodated inside magnet holder 11. In auto focus unit 12, AF (Auto Focus) coil 16 is disposed opposite magnet 14.

In movable unit 1, a current passed through AF coil 16 generates an electromagnetic force between magnet 14 and AF coil 16, while the lens is allowed to move vertically in auto focus unit 12.

Imaging element 17 is disposed on an upper surface of imaging body 13. Imaging element 17 is a semiconductor element, such as a CCD (Charge Coupled Device) image sensor and a CMOS (Complementary Metal Oxide Semiconductor) image sensor.

Imaging element 17 is disposed below the center of round hole 12A. The vertical movement of lens can perform auto focus control in which the video image or the image captured by imaging element 17 is automatically brought into focus.

One end of wire 4 is connected to each of four corners of lower cover 3, and the other end is connected to each of four corners in an upper surface of magnet holder 11 of movable unit 1. Wires 4 retain movable unit 1 on lower cover 3.

Coil retaining bodies 2A to 2D are disposed on front-back and left-right sides of movable unit 1. OIS coil 18 is disposed opposite magnet 15.

A current is passed through OIS coil 18 when the camera shake is generated in lens actuator 20. The electromagnetic force generated between OIS coil 18 and magnet 15 swings movable unit 1.

The swing of movable unit 1 performs shake correction control to correct the shake of the video image or the image captured by imaging element 17.

SUMMARY OF THE INVENTION

However, the above-discussed conventional lens actuator has as many as eight magnets 14 inside of the magnet holder 11 and four magnets 15 on the outer wall. Accordingly, the conventional lens actuator has a heavy weight. Moreover, power consumption is very high due to the current flow during OIS correction due to the heavy weight.

In view of the above problem, as well as other concerns, a lens actuator includes a carrier that is configured to retain a lens; a first coil that is disposed in the carrier while wound about an axis perpendicular to a lens retaining surface; first to fourth magnets that are disposed opposite the first AF coil in four directions parallel to the lens retaining surface; a first OIS coil that is disposed opposite the first magnet; and a third coil that is disposed opposite the second magnet. A current is passed through the first AF coil to move the carrier in a vertical direction along an axis. The currents are passed through the first and second OIS coils to a movable unit in front-back and left-right directions. Therefore, weight reduction of the movable unit can be achieved to provide a lens actuator, in which electric power saving can be achieved.

BRIEF DESCRIPTION OF DRAWINGS

FIG. 14 is an exploded perspective view of the conventional lens actuator.

DETAILED DESCRIPTION OF THE PREFERRED EMBODIMENT

First Exemplary Embodiment

Figure 1:
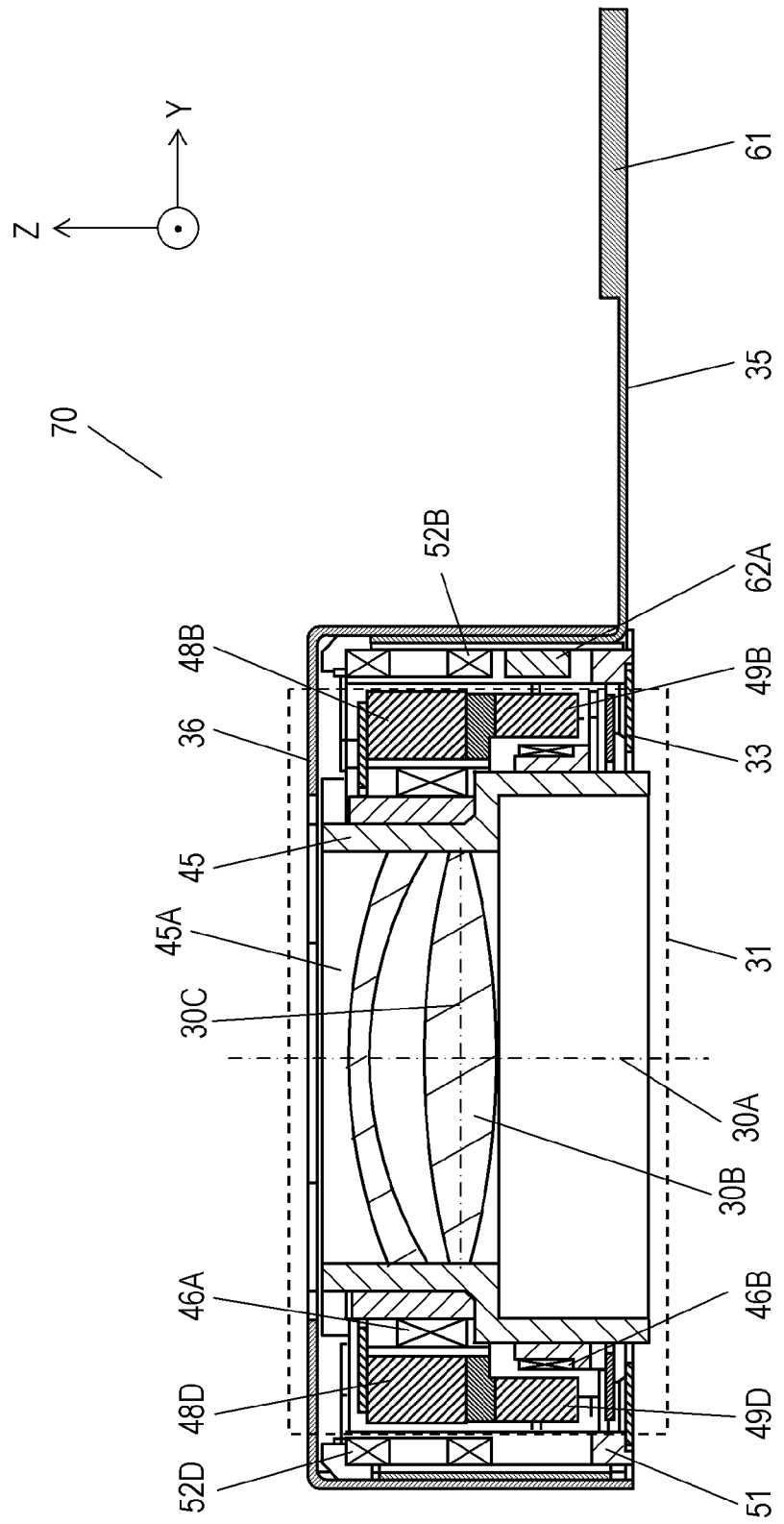
FIG. 1 is a sectional view of a lens actuator according to a first exemplary embodiment.
Figure 2:
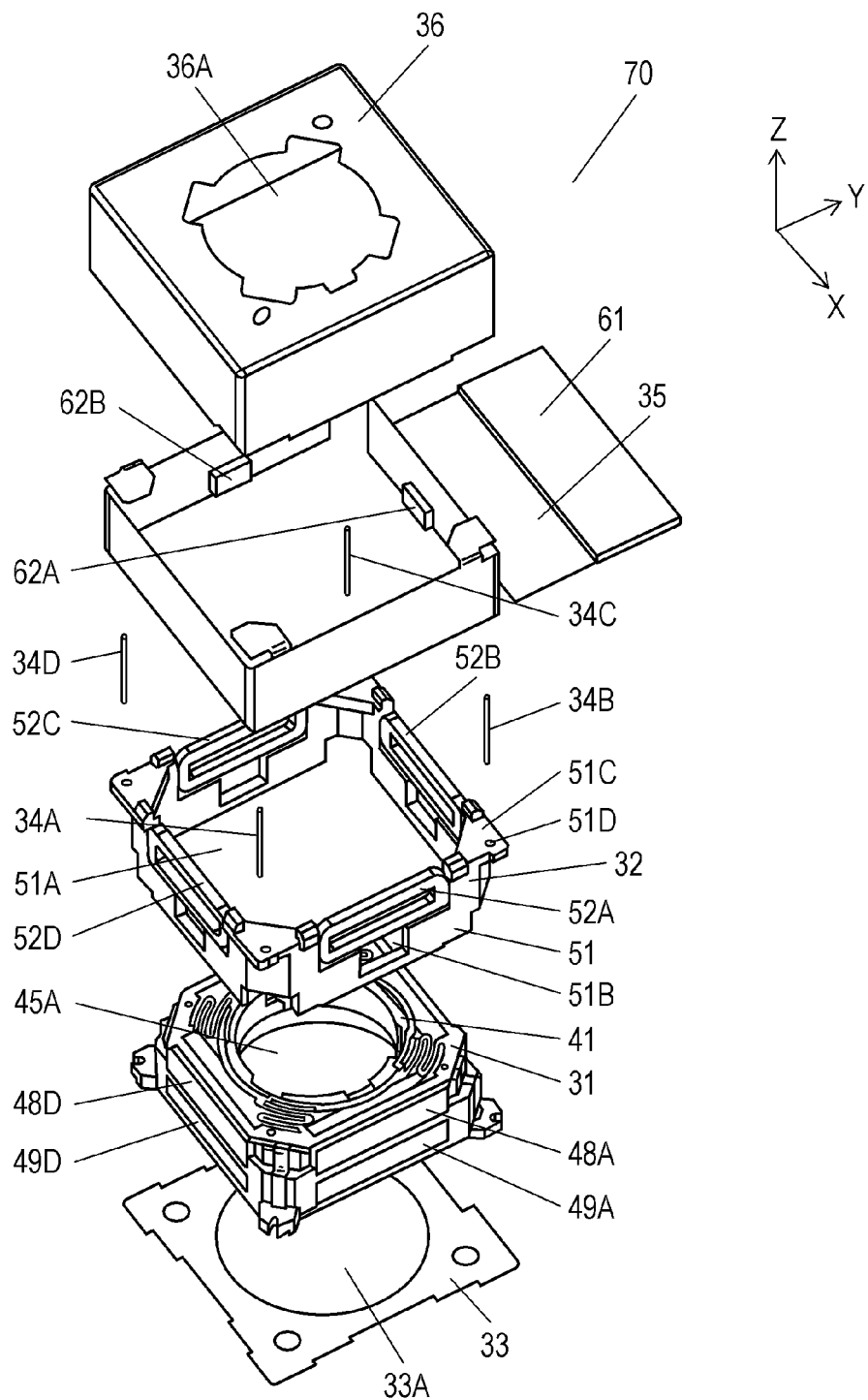
FIG. 2 is an exploded perspective view of the lens actuator of the first exemplary embodiment.
Figure 3:
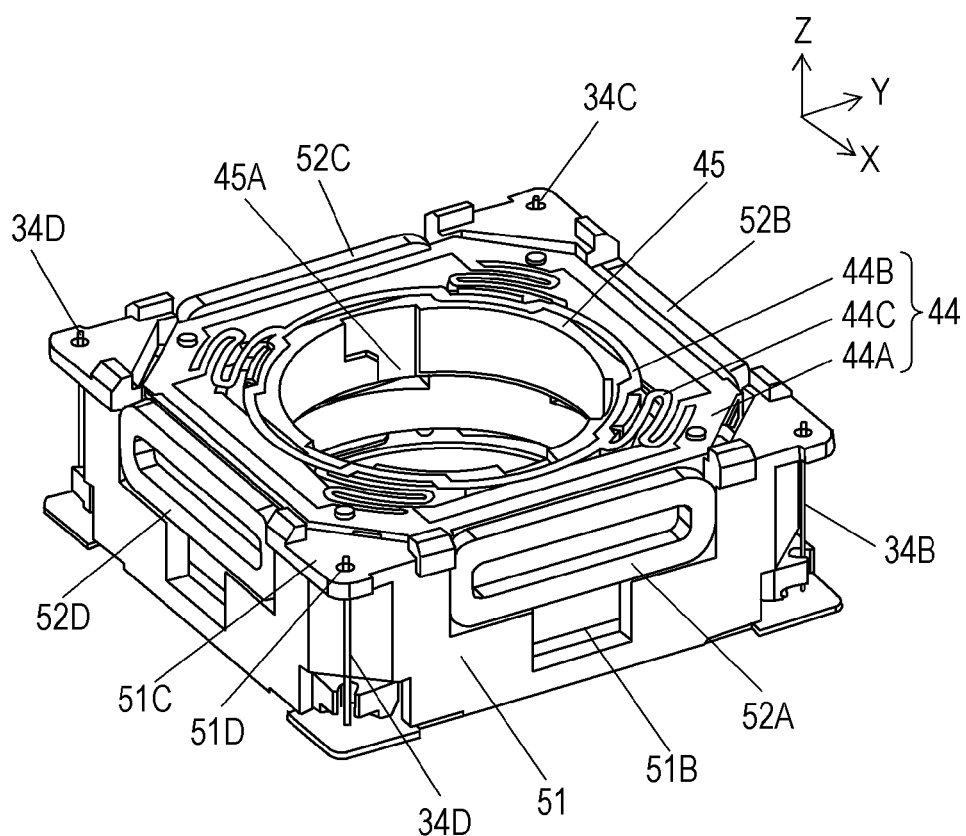
FIG. 3 is a partially perspective view of the lens actuator of the first exemplary embodiment.

FIG. 1 is a sectional view of lens actuator 70 according to a first exemplary embodiment. FIG. 2 is an exploded perspective view of lens actuator 70. FIG. 3 is a partially perspective view of lens actuator 70 from which upper cover 36 and flexible printed board 35 are dismounted.

Lens actuator 70 includes movable unit 31, coil unit 32, lower cover 33, wires 34A to 34D, flexible printed board 35, and upper cover 36.

For example, lens actuator 70 has widths of 5 mm to 20 mm in a left-right direction (Y-axis direction) parallel to a lens retaining surface, depths of 5 mm to 20 mm in a front-back direction (X-axis direction) parallel to the lens retaining surface, and heights of 2 mm to 10 mm in a vertical direction (Z-axis direction) perpendicular to the lens retaining surface, and the width in the left-right direction is substantially equal to the depth in the front-back direction.

Figure 4:
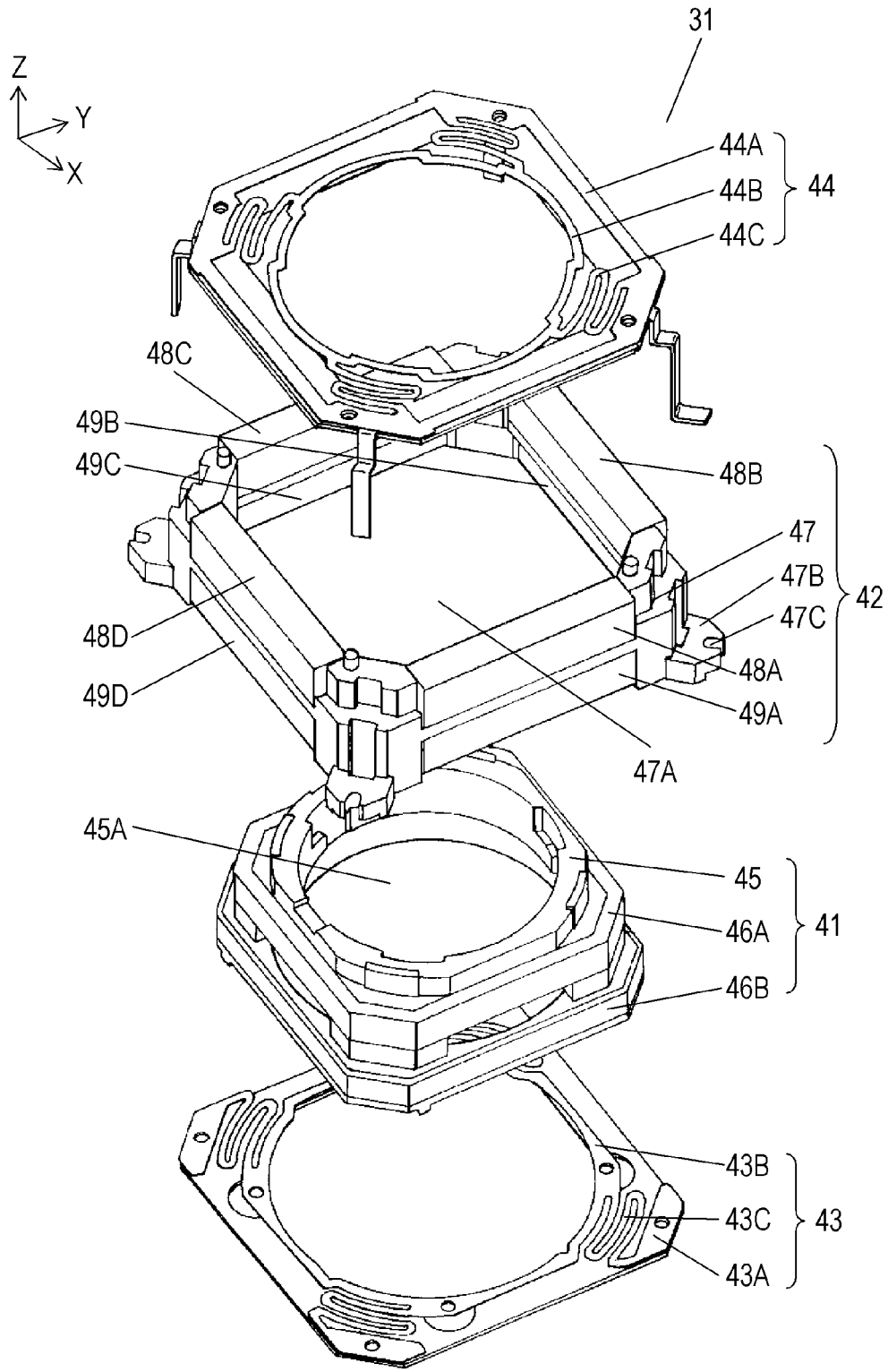
FIG. 4 is an exploded perspective view of a movable unit used for the lens actuator of the first exemplary embodiment.

First, a configuration of movable unit 31 will be described. FIG. 4 is an exploded perspective view of movable unit 31.

As illustrated in FIGS. 1 and 4, movable unit 31 includes lens holder 41, magnet holder 42, lower spring 43, and upper spring 44.

Lens holder 41 includes carrier 45 and AF (Auto Focus) coils 46A and 46B that are disposed on an outer circumference of carrier 45 into two upper and lower stages.

Carrier 45 made of an insulating resin, such as polycarbonate containing glass, has a rectangular box shape that includes round hole 45A in the center. A diameter of round hole 45A may be kept constant or changed. A screw thread may be included inside round hole 45A in order to fix the lens to round hole 45A.

AF coils 46A and 46B are formed such that a coil wire made of an enameled wire having wire diameters of 40 μm to 60 μm is wound around carrier 45 with a center axis direction of round hole 45A as an axis.

Magnet holder 42 includes holder 47, magnets 48A to 48D, and magnets 49A to 49D.

Holder 47 made of an insulating resin, such as polycarbonate containing glass, has a rectangular box shape that includes square hole 47A in the center. Holder-side limbs 47B overhanging on four directions are provided on a bottom surface side of holder 47, and holder-side connection 47C that constitutes a substantially V-shape groove is provided in each holder-side limb 47B.

Slightly large magnets 48A to 48D having a rectangular solid shape and slightly small magnets 49A to 49D having a rectangular solid shape are disposed on side surfaces in the front-back and left-right directions of holder 47. Magnets 48A to 48D and magnets 49A to 49D are located in upper portions and lower portions of the side surfaces with a predetermined distance, respectively. Magnets 48A to 48D and magnets 49A to 49D are fixed to the side surfaces using an adhesive (not illustrated) or the like.

Magnets 48A to 48D and magnets 49A to 49D are magnetized such that magnetic poles on inner surface sides of magnets 48A to 48D and magnets 49A to 49D differ from each other, and such that magnetic poles on lateral surface sides of magnets 48A to 48D and magnets 49A to 49D also differ from each other. For example, the inner surfaces of magnets 48A to 48D are magnetized into an S-pole while the inner surfaces of magnets 49A to 49D are magnetized into an N-pole. Therefore, the lateral surfaces of magnets 48A to 48D are magnetized in the N-pole while the lateral surfaces of magnets 49A to 49D are magnetized in the S-pole.

Magnets 48A to 48D and magnets 49A to 49D are also magnetized such that the magnetic poles of the inner surfaces of magnets 48A to 48D and magnets 49A to 49D, which are vertically disposed, differ from each other. Magnets 48A to 48D and magnets 49A to 49D are also magnetized such that the magnetic poles of the lateral surfaces of magnets 48A to 48D and magnets 49A to 49D differ from each other. Therefore, a radial direction of a magnetic field is rectified to generate the stronger magnetic field.

For example, magnets 48A to 48D and magnets 49A to 49D are neodymium magnets that are rare-earth magnets mainly containing neodymium, iron, and boron. A magnet other than the neodymium magnet may also be used. However, because the neodymium magnet has a large magnetic force, currents passed through AF coils 46A and 46B can be advantageously decreased from the viewpoint of electric power saving. The neodymium magnet having coercive forces of 500 kA/m to 3000 kA/m and residual magnetic flux densities of 1.3 T to 1.5 T is desirably used.

Because the inner surfaces of magnets 48A to 48D are magnetized in the S-pole while the inner surfaces of magnets 49A to 49D are magnetized in the N-pole, magnets 48A to 48D exert repulsive forces on one another, and magnets 49A to 49D exert repulsive forces on one another. In holder 47, sidewalls that are in contact with magnets 48A to 48D and magnets 49A to 49D are desirably provided outside magnets 48A to 48D and magnets 49A to 49D in order to counteract the repulsive forces.

Lens holder 41 is accommodated in square hole 47A of holder 47. Magnets 48A to 48D and magnets 49A to 49D are disposed opposite AF coils 46A and 46B, respectively.

In movable unit 31, the electromagnetic forces are generated between AF coil 46A and magnets 48A to 48D and AF coil 46B and magnets 49A to 49D by passing the currents through AF coils 46A and 46B. The electromagnetic force can vertically move lens holder 41 relative to magnet holder 42.

Lower spring 43 is a conductive-metal plate spring in which outer peripheral portion 43A and inner peripheral portion 43B are connected by a plurality of meandering springs 43C. Upper spring 44 is a conductive-metal plate spring in which outer peripheral portion 44A and inner peripheral portion 44B are connected by a plurality of meandering springs 44C.

Outer peripheral portion 43A and outer peripheral portion 44A are fixed to magnet holder 42, and inner peripheral portion 43B and inner peripheral portion 44B are fixed to lens holder 41. When the currents are not passed through AF coils 46A and 46B, lens holder 41 can return to a predetermined position relative to magnet holder 42.

When the currents are passed through AF coils 46A and 46B, lens holder 41 moves vertically relative to magnet holder 42. Lens holder 41 is stopped by a balance among a gravity applied to lens holder 41, spring forces of lower spring 43 and upper spring 44, and the electromagnetic force. When the currents are not passed through AF coils 46A and 46B, lens holder 41 returns to the predetermined position relative to magnet holder 42.

Referring to FIGS. 1 to 3, structural elements other than movable unit 31 will be described below.

Coil unit 32 includes base 51 and OIS (Optical Image Stabilization) coils 52A to 52D. Base 51 made of an insulating resin or the like has a rectangular box shape that includes square hole 51A in the center. Base 51 includes T-shape grooves 51B that are provided in the sidewalls on front-back and left-right sides and a plurality of base-side limbs 51C that are projected in four directions on the upper surface. Hole 51D is made in each of base-side limbs 51C.

OIS coils 52A to 52D are fixed to an upper half of groove 51B using an adhesive (not illustrated) or the like. OIS coils 52A to 52D are formed such that a coil wire having wire diameters of 40 μm to 60 μm is wound about the axis in the front-back or left-right direction. An enameled wire, such as a polyurethane-copper wire, a polyester-copper wire, and a polyamide-copper wire, is preferably used as the coil wire constituting each of OIS coils 52A to 52D.

Examples of a method for fixing OIS coils 52A to 52D include a method for forming a resin bobbin to directly wind a coil wire around the bobbin and a method for forming an air-core coil and then fixing OIS coils 52A to 52D to base 51 using an adhesive or the like. The method for forming the air-core coil is desirably adopted from the view point of downsizing. Desirably, using a self-welding enameled wire, the coil wires are fused to each other by a hot blast or alcohol to stabilize a shape.

A printed coil can be used as OIS coils 52A to 52D. The printed coil means a coil that is formed by film deposition and patterning.

The film deposition is performed by a method, such as vapor deposition, sputtering, ion plating, electroless plating, and electrolytic plating.

For example, the patterning is performed by a method in which mask formation with a photoresist and etching are combined. The mask is formed on the copper thin film using the photoresist to perform electrolytic plating, and then copper in a portion other than the pattern is removed by etching or the like. The etching may be dry etching or wet etching.

In preparing the printed coil, electrolytic plating may further be performed after a copper thin film is deposited to perform the patterning.

The printed coil may be formed on the printed board. In this case, assembly productivity is improved because the printed coil is not deformed during assembly.

Wires 34A to 34D are conductive-metal wires. Wires 34A to 34D are also called a suspension wire. Movable unit 31 is accommodated in square hole 51A of base 51. Upper ends of wires 34A to 34D are connected in hole 51D of base 51, and lower ends are connected in holder-side connections 47C of holder 47. Movable unit 31 is accommodated in square hole 51A of base 51 with magnets 48A to 48D facing OIS coils 52A to 52D.

Movable unit 31 is connected to coil unit 32 through wires 34A to 34D. Movable unit 31 is retained by wires 34A to 34D, and movable unit 31 can move in coil unit 32 while being maintained in a horizontal position in the front-back and left-right directions.

The outer peripheral portions of magnets 48A to 48D face OIS coils 52A to 52D. When the currents are passed through OIS coils 52A to 52D, the electromagnetic forces generated by magnets 48A to 48D and OIS coils 52A to 52D move movable unit 31 in coil unit 32.

Flexible printed board 35 having flexibility includes connector 61 that has a plurality of terminals on an end surface. A plurality of traces (not illustrated) are provided in flexible printed board 35. Flexible printed board 35 is sterically folded a plurality of times, and bent along the side surface and the upper surface in each of four directions of base 51. Two magnetic-field detection elements 62A and 62B are disposed on two inner surfaces of flexible printed board 35. The two side surfaces are in contact with the inner surface of base 51.

For example, magnetic-field detection elements 62A and 62B are Hall elements that use a Hall effect to a detect magnetic field intensity. When magnet 49B comes close to magnetic-field detection element 62A, or when magnet 49C comes close to magnetic-field detection element 62B, the magnetic field detected by magnetic-field detection element 62A or 62B is increased. When magnet 49B moves away from magnetic-field detection element 62A, or when magnet 49C moves away from magnetic-field detection element 62B, the magnetic field detected by magnetic-field detection element 62A or 62B is weakened.

When movable unit 31 moves in coil unit 32, magnetic-field detection element 62B detects a position in the front-back direction of movable unit 31, and magnetic-field detection element 62A detects a position in the left-right direction of movable unit 31.

AF coils 46A and 46B are electrically connected to the terminals provided in connector 61 of flexible printed board 35 through lower spring 43, upper spring 44, and wires 34A to 34D. OIS coils 52A to 52D are electrically connected to the terminals provided in connector 61 of flexible printed board 35 by connecting end portions of the coil wires constituting OIS coils 52A to 52D to flexible printed board 35. Alternatively, OIS coils 52A and 52C or 52B and 52D may be electrically connected to the terminals provided in connector 61 of flexible printed board 35 while connected in series.

The currents are passed through AF coils 46A and 46B and OIS coils 52A to 52D through the terminals provided in connector 61.

Lower cover 33 including round hole 33A in the center is a metallic plate made of a nonmagnetic material, such as aluminum and nickel silver. Lower cover 33 is fixed to a lower surface of base 51 using an adhesive (not illustrated) or the like.

Upper cover 36 including round hole 36A in the center is made of a nonmagnetic material, such as aluminum and nickel silver. Upper cover 36 is formed into a rectangular box shape with the lower surface opened. Movable unit 31, coil unit 32, wires 34A to 34D, and flexible printed board 35 are accommodated between upper cover 36 and lower cover 33. For example, upper cover 36 is fixed to lower cover 33 by welding or the like. Round hole 36A, round hole 45A, and round hole 33A are continuously made to form a through-hole from the upper surface to the lower surface of lens actuator 70.

Because upper cover 36 and lower cover 33 are both made of the nonmagnetic material, an influence on the electromagnetic forces generated between AF coil 46A and magnets 48A to 48D, AF coil 46B and magnets 49A to 49D, and OIS coils 52A to 52D and magnets 48A to 48D and magnets 49A to 49D is suppressed. Therefore, lens actuator 70 can stably be operated.

Because magnets 48A to 48D are configured to face both AF coil 46A and OIS coils 52A to 52D, weight reduction of movable unit 31 is achieved. Therefore, the electric power saving can be achieved.

AF coil 46A and OIS coils 52A to 52D are disposed opposite the surface in which the magnetic poles of magnets 48A to 48D are formed. AF coil 46B is disposed opposite the surface in which the magnetic poles of magnets 49A to 49D are formed. Magnets 48A to 48D and magnets 49A to 49D are magnetized such that the magnetic pole of the inner surfaces of magnets 48A to 48D and magnets 49A to 49D differ from each other. Magnets 48A to 48D and magnets 49A to 49D are magnetized such that the magnetic pole of the lateral surfaces of magnets 48A to 48D and magnets 49A to 49D differ from each other. The radial direction of the magnetic field is rectified, so that the strong magnetic field can be generated in the positions of AF coils 46A and 46B or OIS coils 52A to 52D. Therefore, the strong magnetic force is generated when the currents are passed through AF coils 46A and 46B or OIS coils 52A to 52D. Accordingly, from the viewpoint of electric power saving, the vertical movement of lens holder 41 and the movements in the front-back and left-right directions of movable unit 31 can desirably be performed by a small amount of current.

In lens actuator 70 configured as above, the lens (not illustrated) is retained in round hole 45A of lens holder 41, the imaging element (not illustrated), such as the CCD image sensor and the CMOS image sensor, is disposed below the lens, and lens actuator 70 is mounted on an electronic instrument, such as the camera and the mobile phone.

AF coils 46A and 46B and OIS coils 52A to 52D are connected to an electronic circuit (not illustrated) of the electronic instrument through the terminals of connector 61.

For example, when a shutter push button (not illustrated) of the electronic instrument is lightly pressed, a voltage is applied to the electronic circuit to pass the current through AF coils 46A and 46B, lens holder 41 and the lens retained in round hole 45A of lens holder 41 move vertically to perform the auto focus control, and the video image or the image is brought into focus.

At this point, orientations of the currents passed through AF coils 46A and 46B and the direction in which lens holder 41 moves relative to magnet holder 42 will be described with reference to FIGS. 5A and 5B.

Figure 5A:
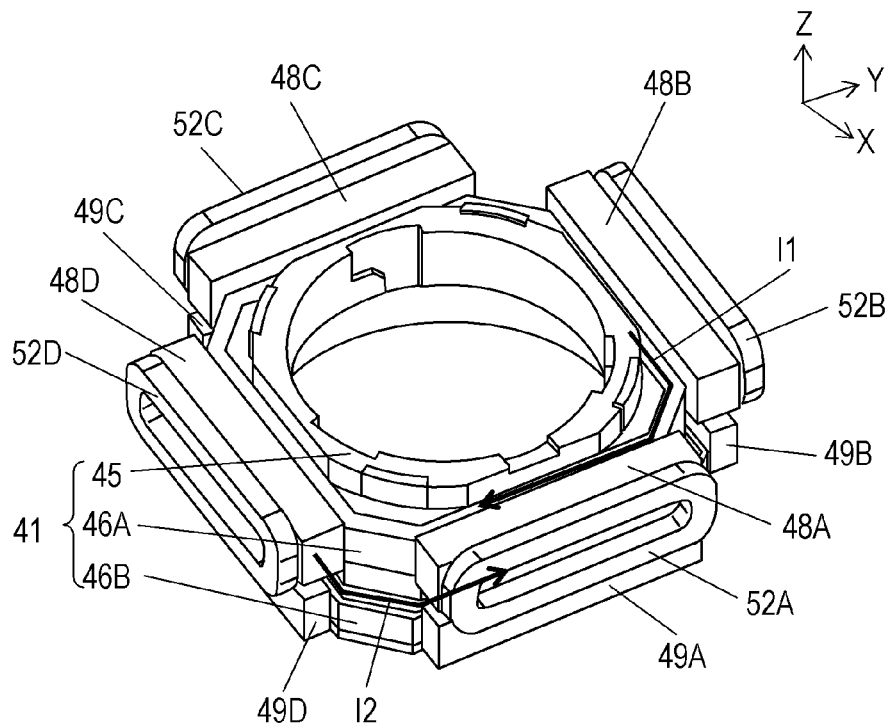
FIG. 5A is a perspective view illustrating an operation of the lens actuator of the first exemplary embodiment.
Figure 5B:
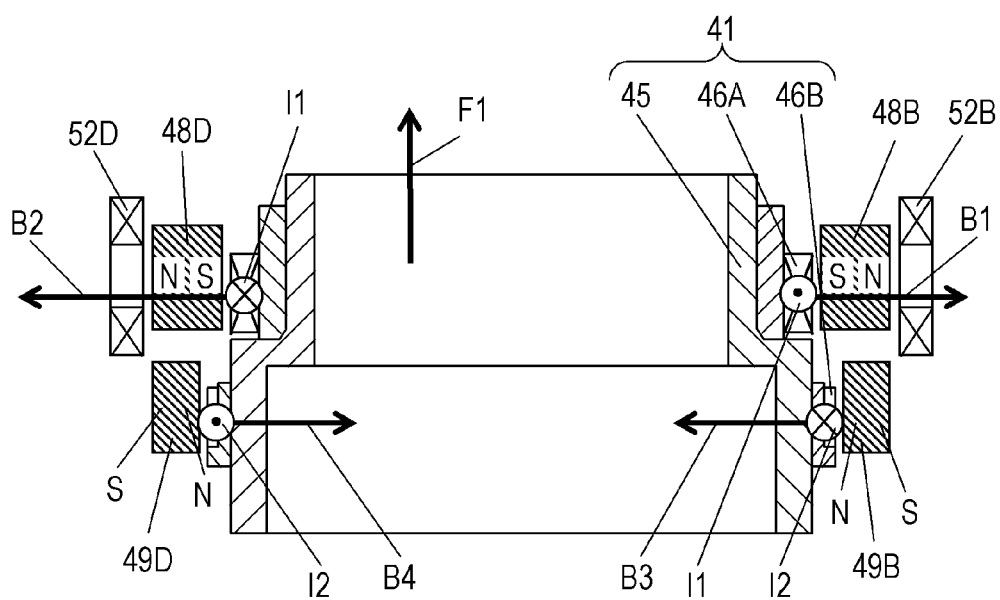
FIG. 5B is a sectional view illustrating the operation of the lens actuator of the first exemplary embodiment.

FIG. 5A is a perspective view illustrating the direction of the current passed through the coil. FIG. 5B is a sectional view illustrating the operation of lens holder 41 in the auto focus control.

In FIG. 5A, carrier 45, AF coils 46A and 46B, magnets 48A to 48D, magnets 49A to 49D, and OIS coils 52A to 52D that are disposed outside magnets 48A to 48D while facing magnets 48A to 48D are extracted and illustrated.

Magnetic fields B1 to B4 are substantially generated in the positions of AF coils 46A and 46B by magnets 48A to 48D and magnets 49A to 49D. As illustrated in FIGS. 5A and 5B, when the currents are passed through AF coils 46A and 46B in directions I1 and I2, an upward force is applied to AF coils 46A and 46B to move lens holder 41 upward. An arrow F1 in FIG. 5B indicates a direction of a resultant force of the forces generated by AF coils 46A and 46B.

On the other hand, when the currents are passed through the AF coils 46A and 46B in the opposite directions to the directions I1 and I2, lens holder 41 moves downward.

The electronic circuit of the electronic instrument controls the currents passed through AF coils 46A and 46B such that the image captured by the imaging element is brought into focus, thereby performing the auto focus control.

When the camera shake occurs while the shooting is performed by further pressing the shutter push button, the electronic circuit detects the vibration using an angular velocity sensor (not illustrated) or the like that is separately provided in the electronic instrument. The electronic circuit moves movable unit 31 in the front-back and left-right directions by controlling the currents passed through OIS coils 52A to 52D, thereby performing shake correction control.

Figure 6A:
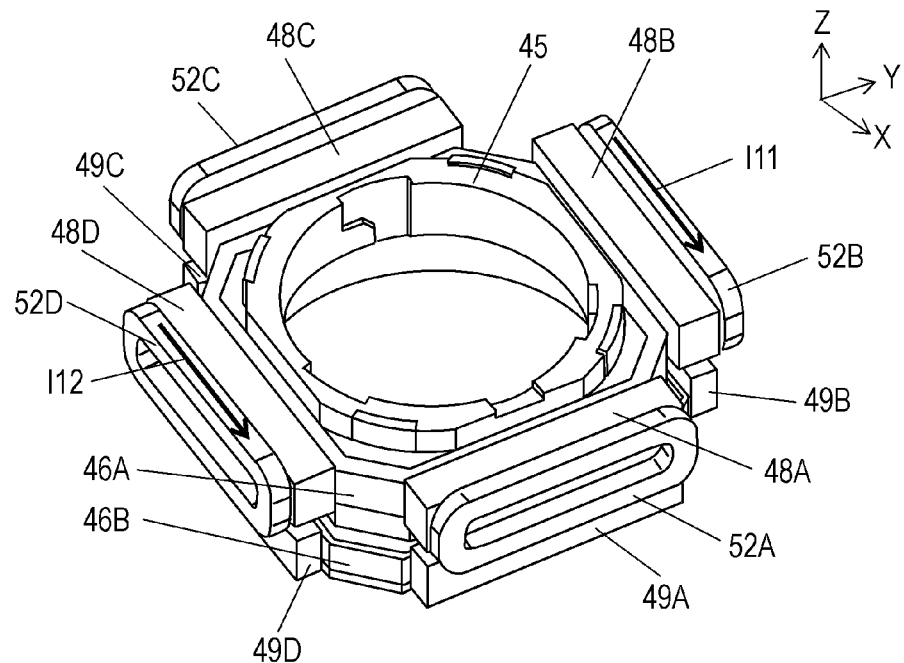
FIG. 6A is a perspective view illustrating the operation of the lens actuator of the first exemplary embodiment.

The shake correction control will be described with reference to FIGS. 6A and 6B. The dispositions of magnets 48A to 48D and magnets 49A to 49D are identical to those in FIGS. 5A and 5B.

OIS coils 52A to 52D are disposed outside magnets 48A to 48D so as to face magnets 48A to 48D, respectively. Magnetic-field detection elements 62A and 62B are disposed outside magnets 49B and 49C so as to face magnets 49B and 49C, respectively.

Figure 6B:
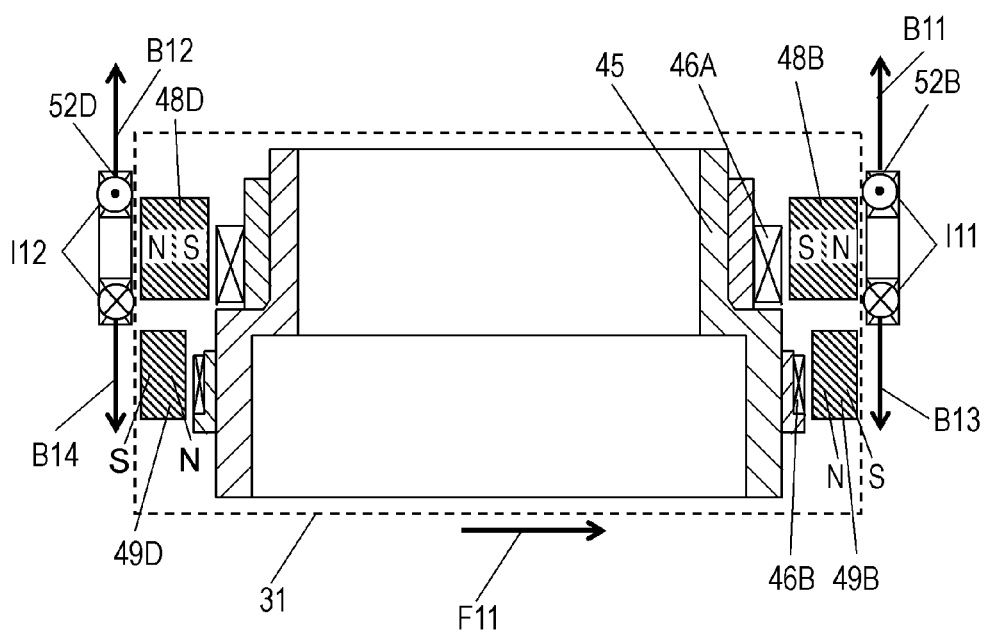
FIG. 6B is a sectional view illustrating the operation of the lens actuator of the first exemplary embodiment.

Referring to a sectional view of FIG. 6B, magnetic fields B11 to B14 are substantially generated in the positions of OIS coils 52B and 52D. Magnets 48A to 48D are moved rightward when the currents are passed through OIS coils 52B and 52D in directions I11 and I12 in FIGS. 6A and 6B. This results in leftward forces in OIS coils 52B and 52D.

At this point, rightward forces are generated as counteraction in magnets 48A to 48D and magnets 49A to 49D. As a result, whole movable unit 31, in which magnets 48A to 48D and magnets 49A to 49D are disposed, moves rightward. An arrow F11 in FIG. 6B indicates a direction of a resultant force of the forces generated by magnets 48A to 48D and magnets 49A to 49D.

When movable unit 31 is moved leftward, the currents are passed through OIS coils 52B and 52D in the opposite directions to the directions I11 and I12. The currents are passed through OIS coils 52A and 52C when movable unit 31 is moved in the front-back direction.

As described above, magnetic-field detection element 62A and 62B detect the position of movable unit 31. The magnetic field intensities detected by magnetic-field detection elements 62A and 62B change according to distances between magnets 49B and 49C and magnetic-field detection elements 62A and 62B, respectively, thereby detecting the position of movable unit 31.

Movable unit 31 is moved in the left-right and front-back directions, whereby the electronic circuit performs the shake correction control to suppress the shake of the video image or the image captured by the imaging element.

Magnets 48A to 48D and magnets 49A to 49D are used as the magnets that generate the electromagnetic forces in both the auto focus control and the shake correction control. This enables the weight reduction of movable unit 31, and the electric power saving is achieved.

OIS coils 52A to 52D are disposed opposite the surface in which the magnetic poles of magnets 48A to 48D are formed, and OIS coils 52A to 52D generate the strong electromagnetic forces, so that movable unit 31 can be moved by a small amount of current.

As to the disposition of the magnet, only four magnets 48A to 48D may be included. The total of four magnets may be included where each of magnets 48A and 49A, magnets 48B and 49B, magnets 48C and 49C, and magnets 48D and 49D is integrally formed. Two magnets may be included where magnets 48A to 48D are formed by one circular magnet and magnets 49A to 49D are formed by one circular magnet. Only one magnet may be included where magnets 48A to 48D are formed by one circular magnet.

Instead of the configuration of the two magnetic-field detection elements, for example, at least three magnetic-field detection elements may be included such that the magnetic-field detection element is disposed below each of OIS coils 52A to 52D.

In the first embodiment, the upper ends of wires 34A to 34D are connected to coil unit 32 while the lower ends of wires 34A to 34D are connected to movable unit 31. Alternatively, the upper ends of wires 34A to 34D may be connected to movable unit 31 while the lower ends of wires 34A to 34D may be connected to coil unit 32.

The video image or the image shot by lens actuator 70 may be a still image or a moving image.

Magnets 48A to 48D and 49A to 49D may be disposed in the positions of the four corners of upper cover 36.

In the configuration in FIGS. 1 to 4, AF coil 46B and magnets 49A to 49D may be eliminated. Therefore, the configuration of the lens actuator can be simplified. In this case, magnetic-field detection element can be disposed opposite the side surface or the bottom surface of one of magnets 48A to 48D.

Magnetic-field detection element 62A and 62B may be disposed opposite the upper surface or the lower surface of one of magnets 48A to 48D and the upper surface or the lower surface of one of magnets 49A to 49D.

In addition to the magnetic field detection, for example, a photoreflector in which reflection of an infrared ray is used may be used as means for detecting the position of movable unit 31.

The influences of OIS coils 52A to 52D on a signal of the imaging element are reduced by upper cover 36 and lower cover 33, which are made of the metallic plate. The influences of the electromagnetic fields generated by passing the currents through OIS coils 52A to 52D on the signal of the imaging element is further reduced because the winding center axes of the OIS coils 52A to 52D are disposed in the front-back and left-right directions.

OIS coils 52A to 52D may be disposed so as to face magnets 48A to 48D or magnets 49A to 49D, above magnets 48A to 48D or below magnets 49A to 49D.

As described above, movable unit 31 includes carrier 45, coil 46A, and magnets 48A to 48D. Carrier 45 is configured to retain lens 30B such that lens 30B is located along lens retaining surface 30C. Coil 46A is disposed in carrier 45 while wound about axis 30A perpendicular to lens retaining surface 30C. Magnets 48A to 48D are disposed opposite coil 46A in four directions parallel to lens retaining surface 30C. Coil 52A is located on the opposite side to axis 30A with respect to magnet 48A, and disposed opposite magnet 48A. Coil 52B is located on the opposite side to axis 30A with respect to magnet 48B, and disposed opposite magnet 48B. The current is passed through coil 46A to move carrier 45 in the vertical direction (Z-axis) along axis 30A. The currents are passed through coils 52A and 52B to move movable unit 31 in the front-back direction (X-axis), which is perpendicular to the vertical direction (Z-axis), and the left-right direction (Y-axis), which is perpendicular to the vertical direction and different from the front-back direction (X-axis).

Movable unit 31 may further include coil 46B, magnets 49A to 49D, and holder 47. Coil 46B is disposed in carrier 45 while wound about axis 30A. Magnets 49A to 49D are disposed opposite coil 46B in four directions parallel to lens retaining surface 30C. Holder 47 fixes magnets 48A to 48D and 49A to 49D. Magnets 49A to 49D are disposed in parallel to the vertical directions (Z-axis) of magnets 48A to 48D, respectively. The magnetic pole of the surface of magnet 48A, which faces coil 46A, differs from the magnetic pole of the surface of magnet 49A, which faces coil 46B. The magnetic pole of the surface of magnet 48B, which faces coil 46A, differs from the magnetic pole of the surface of magnet 49B, which faces coil 46B. The magnetic pole of the surface of magnet 48C, which faces coil 46A, differs from the magnetic pole of the surface of magnet 49C, which faces coil 46B. The magnetic pole of the surface of magnet 48D, which faces coil 46A, differs from the magnetic pole of the surface of magnet 49D, which faces coil 46B.

Lens actuator 10 may further include holder 47 that fixes magnets 48A to 48D, base 51 that fixes coils 52A and 52B, and wires 34A to 34D that connect holder 47 and base 51. Wires 34A to 34D connect holder-side limb 47B disposed in holder 47 and base-side limb 51C disposed in base 51.

When the current is passed through coil 52A, movable unit 31 comes close to or moves away from coil 52A. When the current is passed through coil 52B, movable unit 31 comes close to or moves away from coil 52B.

Second Exemplary Embodiment

Figure 7:
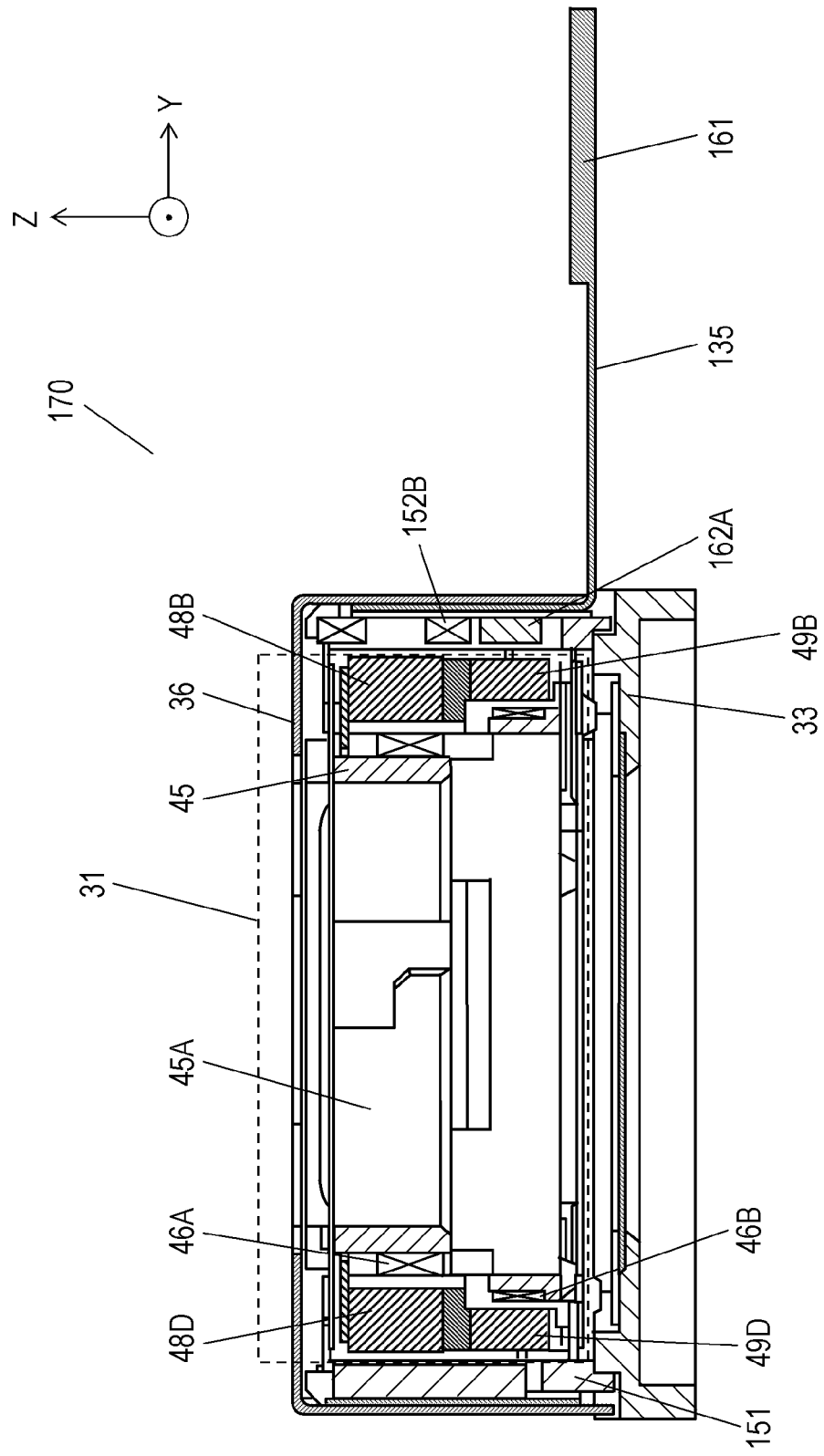
FIG. 7 is a sectional view of a lens actuator according to a second exemplary embodiment.
Figure 8:
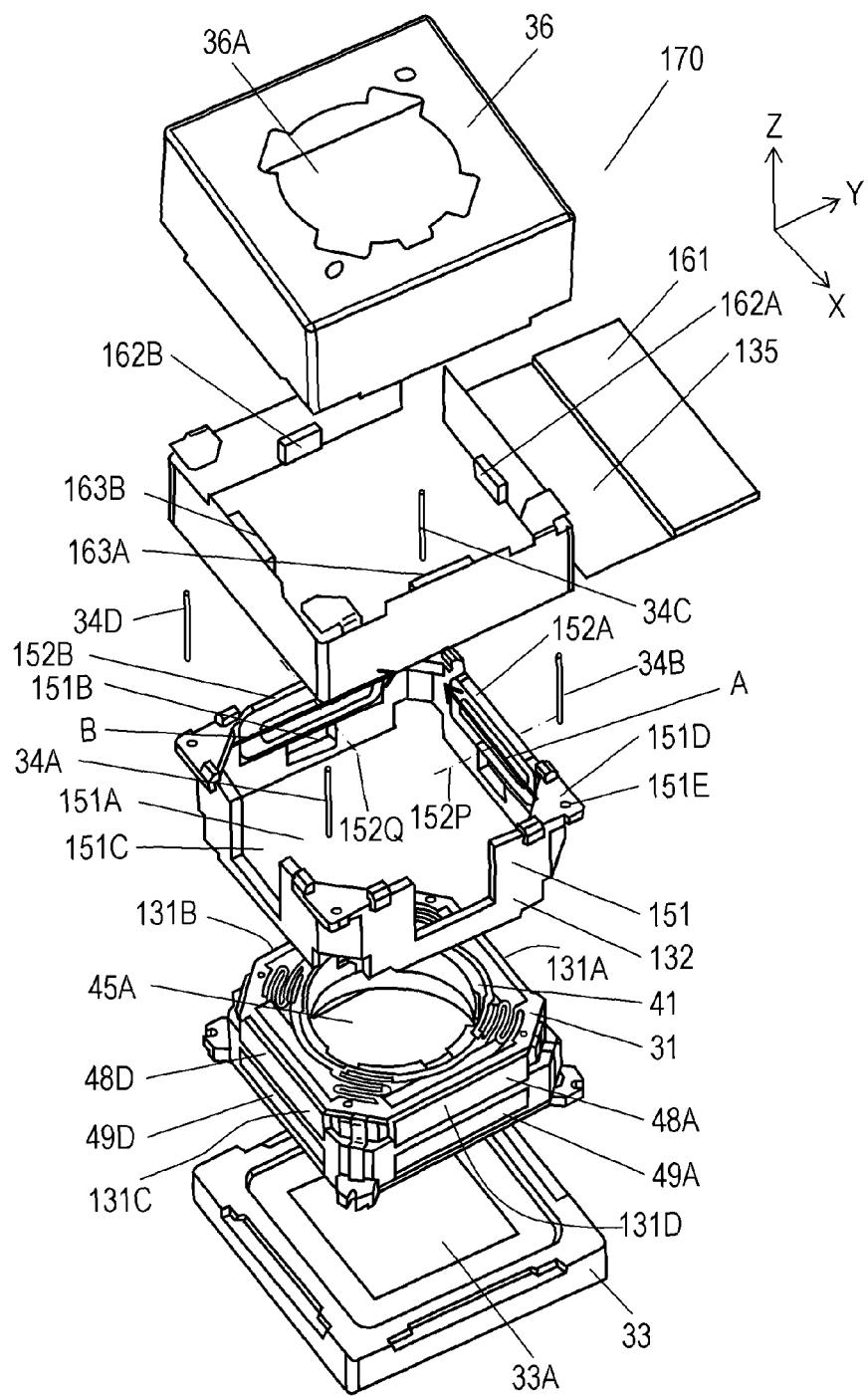
FIG. 8 is an exploded perspective view of the lens actuator of the second exemplary embodiment.
Figure 9:
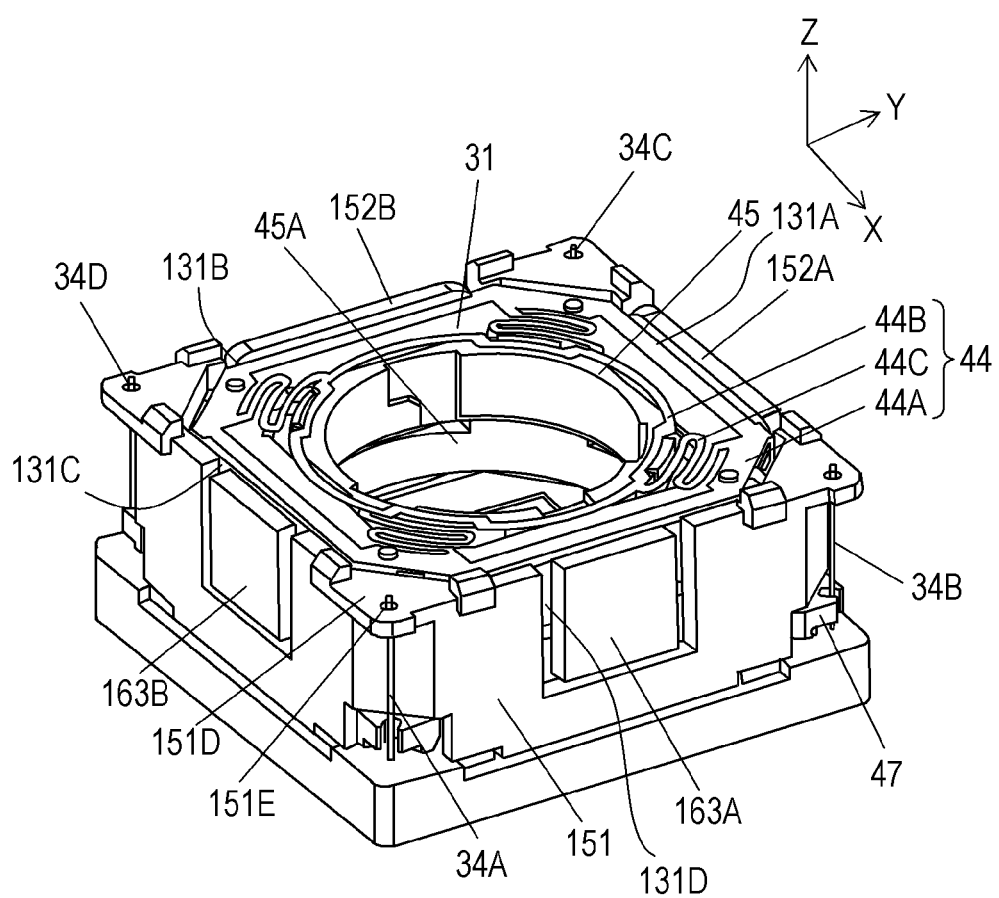
FIG. 9 is a partially perspective view of the lens actuator of the second exemplary embodiment.

FIG. 7 is a sectional view of lens actuator 170 according to a second exemplary embodiment. FIG. 8 is an exploded perspective view of lens actuator 170. FIG. 9 is a partially perspective view of lens actuator 170 from which upper cover 36 and flexible printed board 135 are dismounted.

Lens actuator 170 includes movable unit 31, coil unit 132, lower cover 33, wires 34A to 34D, flexible printed board 135, and upper cover 36.

Lens actuator 170 differs from lens actuator 70 of the first exemplary embodiment in that coil unit 32 is replaced with coil unit 132 and that flexible printed board 35 is replaced with flexible printed board 135.

Coil unit 132 includes base 151 and OIS coils 152A and 152B.

Base 151 made of an insulating resin has a rectangular box shape that includes square hole 151A in the center. Base 151 includes T-shape groove 151B in each of two sidewalls orthogonal to each other and rectangular groove 151C in each of the remaining two sidewalls. Base 151 includes a plurality of base-side limbs 151D that are projected in four directions on the upper surface. Hole 151E is made in each of base-side limbs 151D.

OIS coils 152A and 152B are fixed to groove 151B using an adhesive (not illustrated) or the like. OIS coils 152A and 152B are formed such that a coil wire having wire diameters of 40 µm to 60 µm is wound about the axis in the front-back or left-right direction. An enameled wire, such as a polyurethane-copper wire, a polyester-copper wire, and a polyamide-copper wire, is preferably used as the coil wire constituting each of OIS coils 152A and 152B.

Arrow A and arrow B that are of long-axis directions of OIS coils 152A and 152B are disposed so as to be substantially orthogonal to each other.

Examples of the method for fixing OIS coils 152A and 152B include a method for forming a resin bobbin to directly wind the coil wire around the bobbin and a method for forming an air-core coil and then fixing OIS coils 152A and 152B to base 151 using an adhesive or the like. The method for forming the air-core coil is desirably adopted from the view point of downsizing. In this case, using a self-welding enameled wire, the coil wires are desirably fused to each other by a hot blast or alcohol to stabilize a shape. A printed coil can be used as OIS coils 152A and 152B.

Because magnets 48B and 48C face OIS coils 152A and 152B, movable unit 31 moves in coil unit 132 by the electromagnetic force when the current is passed through OIS coil 152A or 152B.

Flexible printed board 135 includes connector 161 that has a plurality of terminals on the end surface. Flexible printed board 135 has the flexibility, and a plurality of traces (not illustrated) are provided in flexible printed board 135. Flexible printed board 135 is sterically folded a plurality of times, and bent along the side surface and the upper surface in each of four directions of base 151. Two magnetic-field detection elements 162A and 162B and two shake detection elements 163A and 163B are disposed on surfaces in which flexible printed board 135 is in contact with lateral surfaces of base 151.

Magnetic-field detection elements 162A and 162B are disposed in groove 151B of base 151, and shake detection elements 163A and 163B are disposed in groove 151C.

Magnetic-field detection elements 162A and 162B and shake detection elements 163A and 163B are connected to the terminals of the end surface of connector 161 through the traces in flexible printed board 135.

For example, magnetic-field detection elements 162A and 162B are Hall elements that use the Hall effect to the detect magnetic field intensity. The magnetic fields detected by magnetic-field detection elements 162A and 162B are increased when magnets 49B and 49C come close to magnetic-field detection elements 162A and 162B, and the magnetic fields detected by magnetic-field detection elements 162A and 162B are weakened when magnets 49B and 49C move away from magnetic-field detection elements 162A and 162B.

When movable unit 31 moves in coil unit 132, magnetic-field detection element 162B detects the position in the front-back direction of movable unit 31, and magnetic-field detection element 162A detects the position in the left-right direction of movable unit 31.

The shake detection elements 163A and 163B, such as an angular velocity sensor and an acceleration sensor, detect the shake of lens actuator 170. For example, when the angular velocity sensors are disposed as shake detection elements 163A and 163B, one of the angular velocity sensors detects an angular velocity in a yaw direction, and the other detects an angular velocity in a pitch direction. For example, when the acceleration sensors are disposed as shake detection elements 163A and 163B, one of the acceleration sensors detects an acceleration in the front-back direction, and the other detects an acceleration in the left-right direction. Not only the uniaxial shake detection elements, but also biaxial or triaxial shake detection elements may be used as shake detection elements 163A and 163B, or different types of sensors, for example, the angular velocity sensor and the acceleration sensor may be used as shake detection elements 163A and 163B.

The surfaces of flexible printed board 135, in which shake detection elements 163A and 163B are disposed, are fixed to base 151 using an adhesive (not illustrated) or the like. Shake detection elements 163A and 163B are fixed to base 151 that is disposed outside movable unit 31, so that a change in an attitude of lens actuator 170 can accurately be detected when lens actuator 170 shakes.

It is not always necessary that shake detection elements 163A and 163B be orthogonal to each other. However, an angle formed by the surfaces in which shake detection elements 163A and 163B are disposed desirably ranges from 80 degrees to 100 degrees.

AF coils 46A and 46B are electrically connected to the terminals provided in connector 161 of flexible printed board 135 through lower spring 43, upper spring 44, and wires 34A to 34D. OIS coils 152A and 152B are electrically connected to the terminals provided in connector 161 of flexible printed board 135 by connecting the end portions of the coil wires constituting OIS coils 152A and 152B to flexible printed board 135.

The currents are passed through AF coils 46A and 46B and OIS coils 152A to 152D through the terminals provided in connector 161.

OIS coils 152A and 152B that are disposed opposite movable unit 31 are disposed only in two surfaces facing the lateral surfaces of movable unit 31, and the long-axis direction of OIS coil 152A is disposed so as not to be parallel to the long-axis direction of OIS coil 152B. Compared with lens actuator 70 of the first exemplary embodiment, the number of surfaces in which OIS coils 152A and 152B are disposed is decreased to implement a simple disposition, and the assembly productivity is improved to simply produce lens actuator 170.

Because OIS coils 152A and 152B are fixed to base 151, OIS coils 152A and 152B and base 151 are integrally assembled outside of movable unit 31, and the assembly productivity is further improved.

Because shake detection elements 163A and 163B are incorporated in lens actuator 170, the necessity to dispose the same type of shake detection element is eliminated on the electronic instrument side, which contributes to the downsizing of the electronic instrument.

Because shake detection elements 163A and 163B are fixed to base 151, the accuracy with which shake detection elements 163A and 163B detect the shake is improved, and lens actuator 170 is simply assembled.

The lateral surfaces of movable unit 31, which shake detection elements 163A and 163B face, differ from the lateral surfaces of movable unit 31, which OIS coils 152A and 152B face, so that the influences of the electromagnetic fields generated by passing the currents through OIS coils 152A and 152B on shake detection elements 163A and 163B can be reduced to detect the vibration, such as the camera shake, with higher accuracy.

Figure 10:
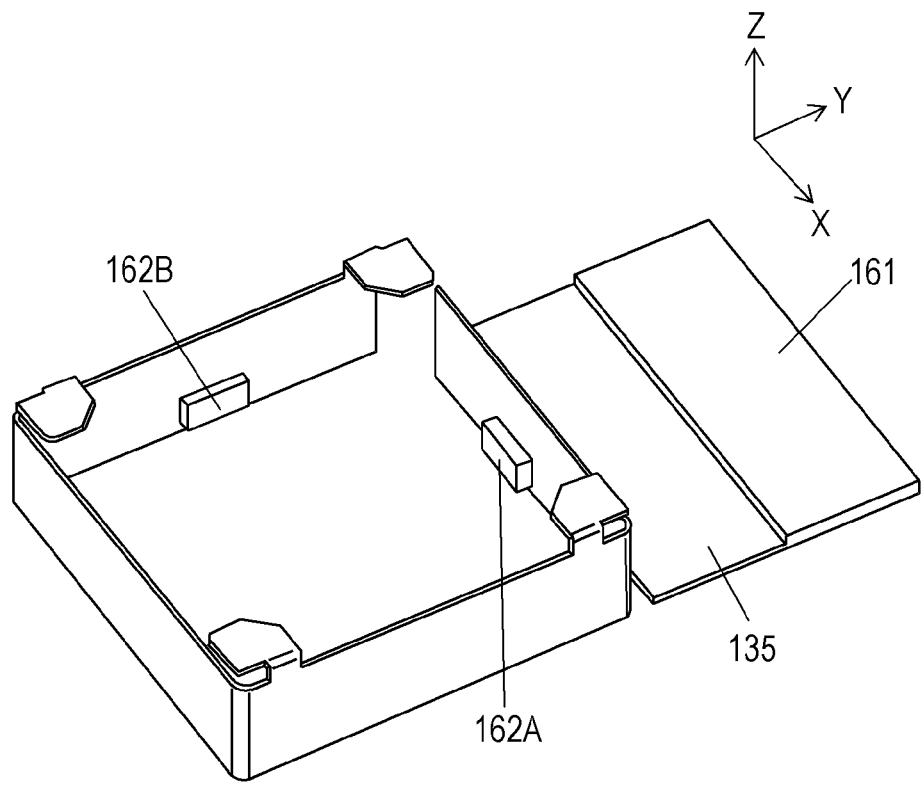
FIG. 10 is a partially perspective view of another lens actuator of the second exemplary embodiment.
Figure 10:
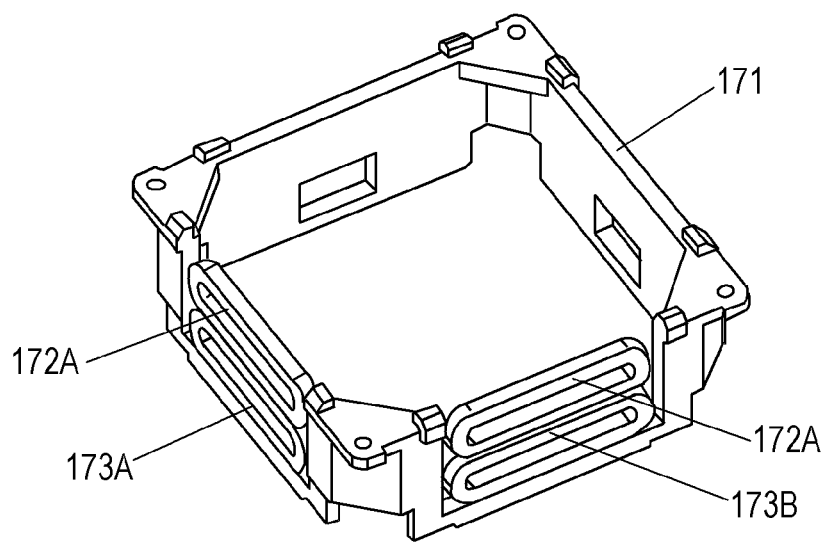

FIG. 10 is a partially perspective view of another lens actuator of the second exemplary embodiment. OIS coils 172A and 172B are disposed at the upper stages in the two surfaces of base 171, and OIS coils 173A and 173B are disposed at the lower stages. The electromagnetic force is increased when the coils are arrayed at the upper and lower stages, so that large driving power can be obtained to movable unit 31 with a simple structure.

As described above, in lens actuator 170, movable unit 31 includes lateral surfaces 131A to 131D that are located in four directions parallel to lens retaining surface 30C. Coil 152A is disposed opposite lateral surface 131A of movable unit 31. Coil 152B is disposed opposite lateral surface 131B of movable unit 31. Coils 152A and 152B do not face lateral surfaces 131C and 131D of movable unit 31. Coil 152A is wound about center axis 152P. Coil 152B is wound about center axis 152Q that is not parallel to center axis 152P.

Lens actuator 170 may further include base 151 that is disposed outside movable unit 31 and shake detection element 163B that is fixed to base 151. Coils 152A and 152B and shake detection element 163B are fixed to base 151. Shake detection element 163B is disposed opposite lateral surface 131C of movable unit 31.

Figure 11A:
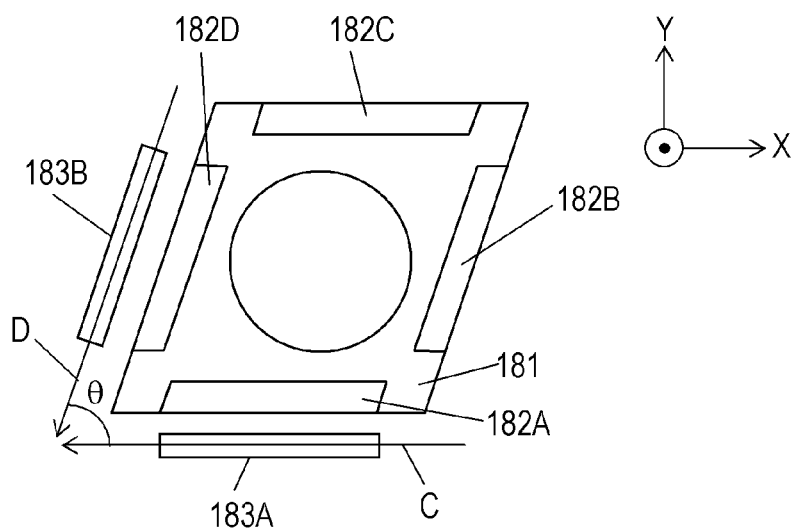
FIGS. 11A and 11B are plan views illustrating a configuration of a main part of another lens actuator of the second exemplary embodiment.
Figure 11B:
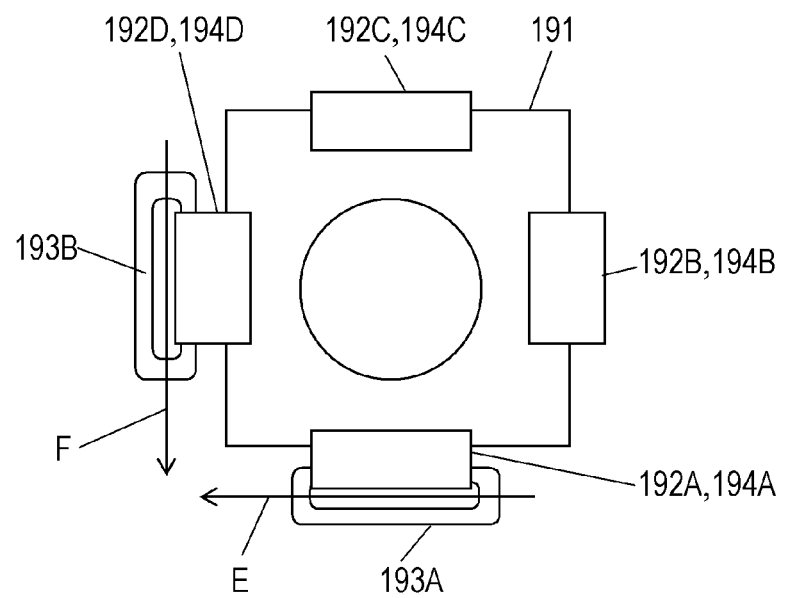

FIGS. 11A and 11B are plan views illustrating a configuration of a main part of another lens actuator of the second exemplary embodiment.

Referring to FIG. 11A, rectangular columnar base 181 has a parallelogram shape when viewed from above. Magnets 182A to 182D are disposed in four surfaces that constitute the lateral surfaces of base 181. OIS coils 183A and 183B are disposed opposite the two surfaces in which magnets 182A and 182D are disposed. As to a positional relationship between OIS coils 183A and 183B, as long as arrows C and D that are of the long-axis directions of OIS coils 183A and 183B are not parallel to the OIS coil disposed in another surface, it is not always necessary that OIS coils 183A and 183B be orthogonal to each other.

However, when an angle θ formed by the long-axis directions of OIS coils 183A and 183B is close to 0 degree or 180 degrees, it is necessary to control the currents passed through OIS coils 183A and 183B in consideration of a correlation of the passed currents. Therefore, desirably the angle θ formed by the long-axis directions of OIS coils 183A and 183B ranges from 80 degrees to 100 degrees.

Referring to FIG. 11B, magnets 192A to 192D are disposed in four surfaces that constitute the lateral surfaces of base 191. In the two surfaces in which magnets 192A and 192D are disposed, OIS coils 193A and 193B are disposed such that at least parts of magnets 192A and 192D and OIS coils 193A and 193B overlap each other when viewed from above.

Magnets 192A to 192D are disposed at the upper stage while magnets 194A to 194D are disposed at the lower stage, and OIS coil 193A may be disposed between magnet 192A and magnet 194A while OIS coil 193B is disposed between magnet 192D and magnet 194D.

OIS coils 193A and 193B may be wound about the center axis in the vertical direction. OIS coils 193A and 193B are disposed such that arrows E and F in the long-axis direction of OIS coils 193A and 193B are not parallel to each other.

Magnetic-field detection elements 162A and 162B are disposed so as to face lateral surfaces different from the lateral surfaces of movable unit 31 that OIS coils 152A and 152B face. Magnetic-field detection elements 162A and 162B may be disposed so as to face the same lateral surfaces as the lateral surfaces of movable unit 31 that OIS coils 152A and 152B face. However, the influence of the electromagnetic fields generated by passing the currents through OIS coils 152A and 152B on magnetic-field detection elements 162A and 162B can be reduced by disposing the Magnetic-field detection elements 162A and 162B in the different lateral surfaces. Therefore, the position of movable unit 31 can be detected with high accuracy to perform more correctly the shake correction control.

Figure 12:
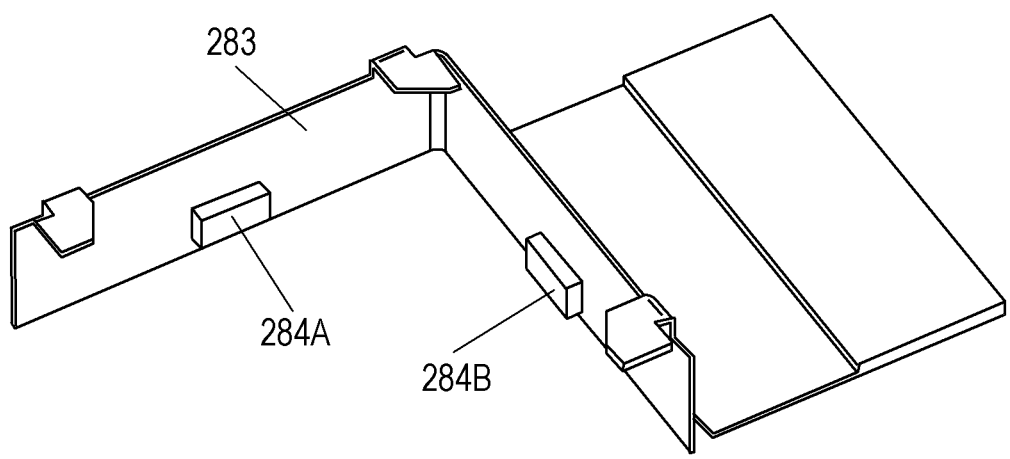
FIG. 12 is a perspective view illustrating the main part of another lens actuator of the second exemplary embodiment.
Figure 12:
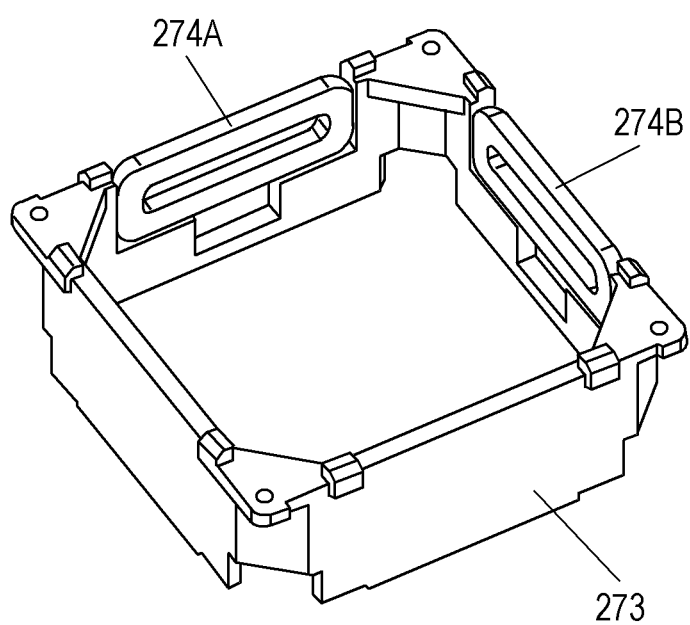
Figure 13:
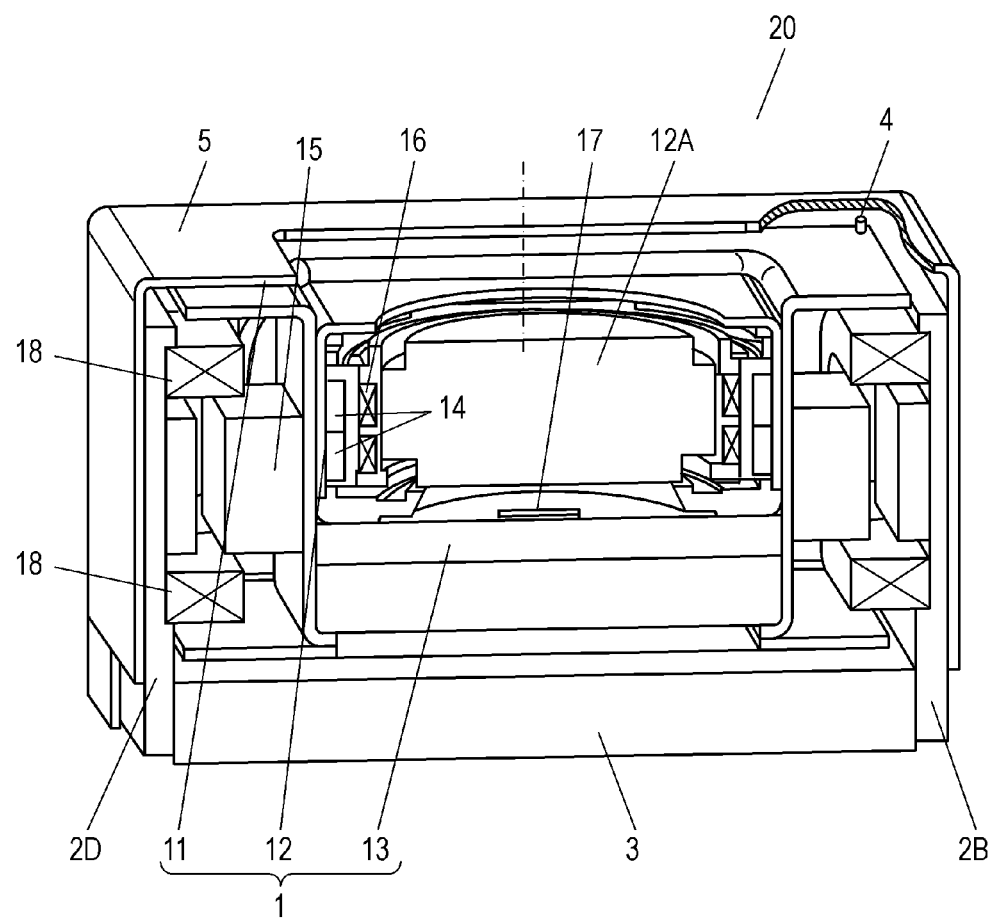
FIG. 13 is a perspective sectional view of a conventional lens actuator.

FIG. 12 is a perspective view illustrating the main part of another lens actuator of the second exemplary embodiment.

Flexible printed board 283 is disposed opposite the base 273 in the two surfaces. The downsizing of flexible printed board 283 can be achieved to produce flexible printed board 283 at low cost.

When magnetic-field detection elements 284A and 284B are disposed below OIS coils 274A and 274B, the side surfaces of base 273 in which OIS coils 274A and 274B are not disposed can be thinned. Therefore, the configuration in FIG. 12 is suitable to the downsizing of the lens actuator. In the first and second exemplary embodiments, the term indicating the direction, such as "vertical direction", "left-right direction", and "front-back direction", does not mean the absolute direction of the vertical direction and the like, but the relative direction that depends only on a relative positional relationship among the lens-actuator structural components, such as the coil and the magnet.

What is claimed is:

1. A lens actuator comprising:
a movable unit that includes
a carrier retaining a lens such that the lens is located along a lens retaining surface,
a first AF coil being disposed in the carrier and wound about an axis perpendicular to the lens retaining surface, and
first to fourth magnets being disposed to face the first AF coil in four directions parallel to the lens retaining surface and farther from the axis than the first AF coil;
a first OIS coil that is located on an opposite side to the axis with respect to the first magnet and farther from the axis than the first magnet; and
a second OIS coil that is located on an opposite side to the axis with respect to the second magnet and farther from the axis than the second magnet, wherein
the first to fourth magnets are arranged to generate a first magnetic field reaching the first AF coil, the first magnet is arranged to generate a second magnetic field reaching the first OIS coil, the second magnet is arranged to generate a third magnetic field reaching the second OIS coil,
the first AF coil is arranged to flow a first current there through to move the carrier in a vertical direction along the axis due to a force generated by the first magnetic field and the first current flowing through the first AF coil, and
the first OIS coil is arranged to flow a second current therethrough, to move the movable unit in a front-back direction, which is perpendicular to the vertical direction, due to a force generated by the first magnetic field and the second current flowing through the first AF coil, and
the second OIS coil is arranged to flow a third current therethrough to move the movable unit in a left-right direction, which is perpendicular to the vertical direction and different from the front-back direction, due to a force generated by the third magnetic field and the third current flowing through the second AF coil.

2. The lens actuator according to claim 1, wherein the movable unit further includes:
a second AF coil that is disposed in the carrier while wound about the axis;
fifth to eighth magnets that are disposed to face the second AF coil in four directions parallel to the lens retaining surface; and
a holder that fixes the first to eighth magnets,
the fifth to eighth magnets are disposed in parallel to the vertical direction of the first to fourth magnets,
a magnetic pole of a surface facing the first AF coil of the first magnet differs from a magnetic pole of a surface facing the second AF coil of the fifth magnet,
a magnetic pole of a surface facing the first AF coil of the second magnet differs from a magnetic pole of a surface facing the second AF coil of the sixth magnet,
a magnetic pole of a surface facing the first AF coil of the third magnet differs from a magnetic pole of a surface facing the second AF coil of the seventh magnet, and
a magnetic pole of a surface facing the first AF coil of the fourth magnet differs from a magnetic pole of a surface facing the second AF coil of the eighth magnet.

3. The lens actuator according to claim 1, further comprising:
a holder that fixes the first to fourth magnets;
a base that fixes the first OIS coil and the second OIS coil; and
a plurality of wires that connect the holder and the base, wherein
the holder includes a holder-side limb, the base includes a base-side limb, and the plurality of wires connect the holder-side limb and the base-side limb.

4. The lens actuator according to claim 1, wherein
the movable unit comes close to or moves away from the first OIS coil when the second current is passed through the first OIS coil, and
the movable unit comes close to or moves away from the second OIS coil when the third current is passed through the second OIS coil.

5. The lens actuator according to claim 1, wherein
the movable unit includes first to fourth lateral surfaces that are located in the four directions,
the first OIS coil is disposed opposite the first lateral surface of the movable unit,
the second OIS coil is disposed opposite the second lateral surface of the movable unit,
the first OIS coil and the second OIS coil do not face the third and fourth lateral surfaces of the movable unit,
the first OIS coil is wound about a first center axis, and
the second OIS coil is wound about a second center axis that is not parallel to the first center axis.

6. The lens actuator according to claim 5, further comprising:
a base that is disposed outside the movable unit; and
a shake detection element that is fixed to the base, wherein
the first OIS coil, the second OIS coil, and the shake detection element are fixed to the base, and the shake detection element is disposed opposite the third lateral surface of the movable unit.

* * * * *